Aug. 10, 1954     J. WALDVOGEL     2,685,847
TRUCK AXLE BOX MOUNTING FOR RAILWAY ROLLING STOCK
Filed March 15, 1950
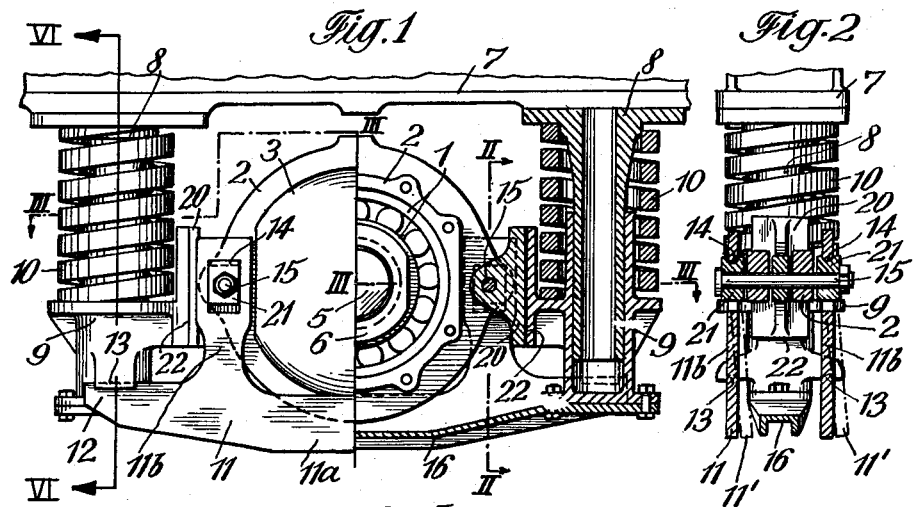
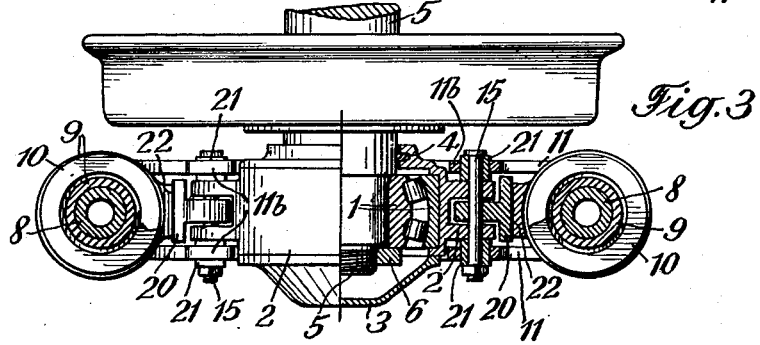
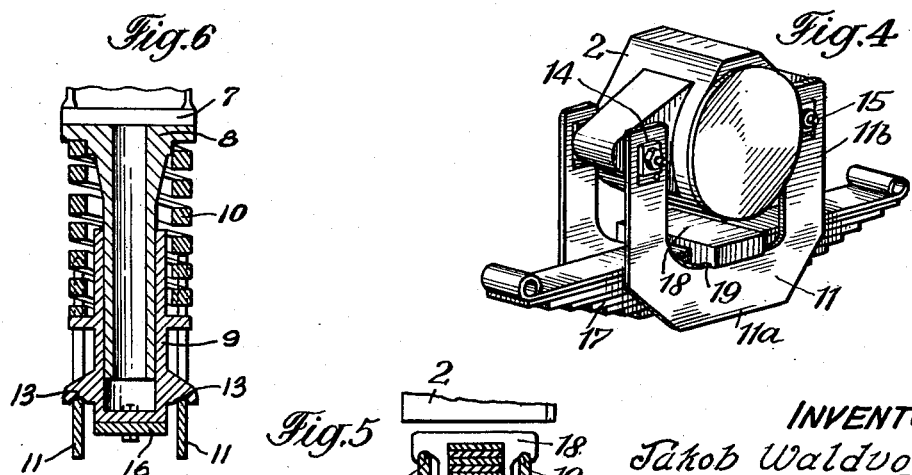
INVENTOR:
Jakob Waldvogel Patented Aug. 10, 1954

2,685,847

UNITED STATES PATENT OFFICE 2,685,847

TRUCK AXLE-BOX MOUNTING FOR RAILWAY ROLLING STOCK

Jakob Waldvogel, Winterthur, Switzerland, assignor to Schweizerische Lokomotiv- und Maschinenfabrik, Winterthur, Switzerland Application March 15, 1950, Serial No. 149,713

Claims priority, application Switzerland March 21, 1949

4 Claims. (Cl. 105—223)

My present invention relates to a transversely movable axle-box mounting for rail-bound vehicles, in which the spring-supported truck frame or car body is rockably accommodated on at least one hanger or stirrup which in turn is oscillatably suspended from the axle box.

A mounting of this type known in the art comprises two main parts, viz. a U-shaped hanger or stirrup and a beam. The said hanger is supported in a transversely rockable relation on the top of the axle box, whilst the said beam is articulated to the lower ends of the two hanger legs and is loaded from the truck frame through resilient elements.

In another transversely movable mounting known in the art, which also comprises two main parts, the stirrup is not put over the top of the axle box, but is disposed inside the latter and is directly supported on the axle bearing in a transversely movable relation. The transversely movable axle box which surrounds the stirrup, either abuts against the top of the latter in a transversely oscillatable relation or is articulated to the depending lateral stirrup legs in a transversely rockable relation similar to the first-mentioned mounting. The axle box thus assumes the function of a beam on which the vehicle or truck frame is spring-supported.

The said known transversely movable mountings require more space on the top of the axle bearing than rigid axle bearings. This proves a disadvantage in cases where it is desired to dispose the vehicle frame directly above the axle-box centers and to make the frame as shallow as possible such as by using H-beams or box girders.

A further disadvantage of the said known mounting is that the point of engagement or bearing of the rockable support cannot be arranged at the level of the axle-box center, but must be disposed above the same. Such arrangement gives origin to a tilting moment on the axle bearing when the mounting swings laterally, and thus causes undesirable one-sided additional stresses on the bearing portion.

The said disadvantages are avoided by my present invention in that the hanger or stirrup comprises a beam portion disposed below the axle box, and two rockable supporting portions integral with the said beam portion, the said supporting portions being disposed on both sides of the axle box and articulated thereto in a transversely movable relation. The mounting according to my present invention on the one hand affords a simple design of the oscillatable stirrup and, on the other hand, does not encroach on the space above the axle box, with the result that the truck frame portions to be disposed at this locality may be depressed and their lateral dimensions are not restricted.

The two rockable supporting portions suitably are articulated to the axle box at the level of the car axle, so as to give rise to transverse forces only, but not to tilting moments, when the mounting swings out laterally.

Three forms of my invention are illustrated in the accompanying drawing, in which—

Fig. 1 shows an elevation of the first example, i. e. a side view in the left-hand portion and a vertical section in the right-hand portion, Fig. 2 shows a cross-section on the line II—II of Fig. 1, Fig. 3 shows a horizontal section on the broken line III—III of Fig. 1, Fig. 4 shows the second example in a perspective view, Fig. 5 a vertical section of the second example transversely of the springs, and Fig. 6 is a vertical section on the line VI—VI of Fig. 1.

In the first example (Figs. 1, 2, 3 and 6), the axle bearing comprises a self-aligning roller bearing 1 and an axle box 2 with a cover 3 and sealing ring 4. The inner bearing ring is secured to the car axle 5 by means of a nut 6. A vertical guide stud 8 is fixed to the vehicle frame 7 on both sides of the axle box 2. A spring pocket 9 receiving the supporting spring 10 is guided on each said stud. The two spring pockets 9 are interconnected by means of a spacing bar 16. The frame or truck load is transmitted from the spring pockets 9 on to the axle box 2 through two similar, parallel swing hangers or stirrups 11. Each of the latter comprises a bridge portion 11a and two prop-portions 11b. The bridge portions 11a pass below the axle box and at their ends support the spring pockets 9 on knife-edge bearings 13, whilst the props 11b disposed on either side of the axle box, are suspended by means of knife edges 14 on saddle pieces 21 carried by a pin 15 traversing the box structure 2. The props are thus pivotally connected to the axle box and may effect a pendular movement in transverse direction. On swinging or rocking laterally, the oscillatable props 11b, the spring pockets 9 and the axle-bearing 1—4 together form a parallelogram wherein the hangers 11 assume the position 11' shown in Fig. 2 by dash-and-dot lines. The axle box thus is correctly guided, but does not perform any oscillatory movements proper. If desired from any reason, the two hangers 11 could be slightly inclined relative to each other, instead of being mounted parallel as shown.

It will be appreciated from Figs. 1-3 and 6 that the space intermediate the axle bearing and vehicle or truck frame is not encroached upon by parts of the hangers 11, so that the designer may provide the cross-sectional dimension and arrangement of the vehicle or truck frame unhampered by such limitation of space. All the knife-edge bearings of the oscillatable props are readily accessible and, therefore, may be easily inspected and attended to. Since the props 11b are articulated to the axle box 2 at the level of the car axle, only transverse forces but no tilting moments are set up in the axle bearing when the mounting swings out laterally.

In the second example, shown in Figs. 4 and 5, the two laterally disposed helical springs 10 of the first example are replaced by a single leaf spring packet 17. The rockably swing hangers or stirrups 11 here again comprise a beam portion 11a and two vertically disposed and laterally oscillatable props 11b each. The center part of the beam portion 11a below the axle box 2 is adapted to accommodate the leaf springs 17 on two knife-edges 19 provided on the bridge portion 11a of the hangers 11. The oscillatable props 11b, however, which are disposed at both sides of the axle bearing are articulated to the axle box substantially at the level of the axle and in a transversely movable relation, as in the first example. The axle bearing may be in form of a self-aligning roller bearing or of a plain journal bearing or of two roller bearings.

In all of the three examples shown and described, special slippers or sliding shoes 20 provided with guideways 22 may be arranged on both sides of the axle box for the purpose of transmitting the traction and braking forces acting longitudinally of the vehicle. Transmitting elements of other types such as guiding links, however, could be provided for.

What I claim as new and desire to secure by Letters Patent, is:

1. In a truck suspension for rail vehicles, the combination with a vehicle frame and an axle having a journal and a journal box at each end thereof adjustable about an axis extending longitudinally with respect to the vehicle frame, a vertically movable guide body, means carried by the vehicle frame for vertically guiding said body, and two hangers associated with each journal box at the ends of said axle and situated in transverse planes with respect to the truck axle, each of said two hangers having a bridge portion positioned below the journal box and two arms extending upwardly from the bridge portion and laterally of the journal box, said arms being pivotally connected to the journal box at either side thereof and said bridge portion being pivotally connected to said guide body at a level situated below the pivotal connection of said arms so as to permit transverse oscillatory movements of the hangers, whereby the axis of the axle box is maintained at right angles to the vertical axis of the guide body when said hangers are transversely swung out of their vertical position.

2. A truck suspension for rail vehicles as defined in claim 1, wherein those arms of said two hangers which are situated at the same side of the journal box are mounted on a common bolt so as to be transversely oscillatable, said bolt being parallel to the axle and situated substantially at the level of the axis thereof.

3. A truck suspension for rail vehicles as claimed in claim 1 wherein said guide body is formed as a spring saddle of a leaf spring assembly situated below the journal box and on which the vehicle frame bears, said two hangers extending at either side of the leaf spring assembly and having their bridge portions pivotally bearing by their central portion against said spring saddle.

4. In a truck suspension for rail vehicles, the combination with a vehicle frame and an axle having a journal and a journal box at each end thereof adjustable about an axis extending longitudinally with respect to the vehicle frame, a vertically movable guide body formed with two guide sleeves guided each along a vertical guide stud on the vehicle frame, and two hangers associated with each journal box at the ends of said axle and situated in transverse planes with respect to the truck axle, each of said two hangers having a bridge portion positioned below the journal box, said bridge portions having end portions extending beyond the base of the arms and pivotally supporting said two guide sleeves, said two hangers further comprising two arms extending upwardly from said bridge portion and laterally of the journal box and being pivotally connected to the journal box at either side thereof, the pivotal connection of said bridge end portions being situated at a level below the pivotal connection of said arms with said journal box so as to permit transverse oscillatory movements of the hangers, whereby the axis of the axle box is maintained at right angles to the vertical axis of the guide body when said hangers are transversely swung out of their vertical position.

References Cited in the file of this patent

UNITED STATES PATENTS

| Number | Name | Date |
|---|---|---|
| 2,267,210 | Mussey | Dec. 23, 1941 |
| 2,301,705 | Kirsten et al. | Nov. 10, 1942 |
| 2,473,732 | Shilling | June 21, 1949 |

FOREIGN PATENTS

| Number | Country | Date |
|---|---|---|
| 23,244 of 1914 | Great Britain | Oct. 28, 1915 |